Figure 1:
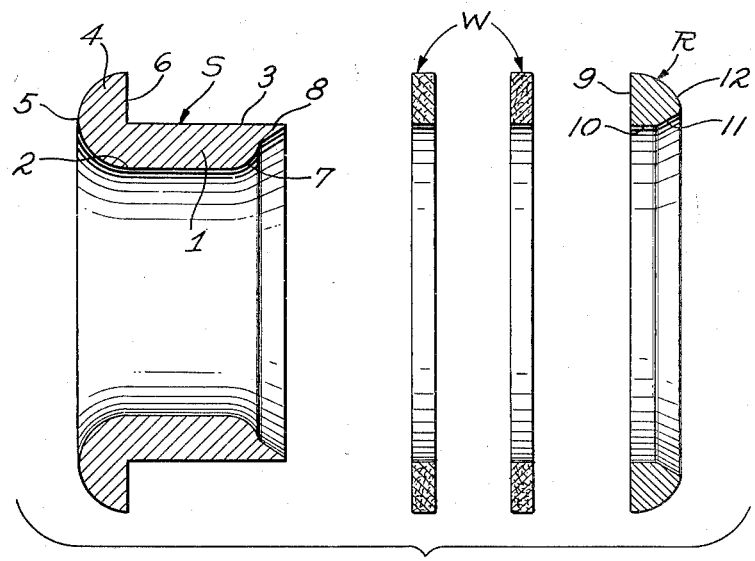

Jan. 29, 1952  H. A. WHITE  2,583,719

GROMMET

Filed May 10, 1946

INVENTOR.
HAROLD A. WHITE
BY Richey & Watt
ATTORNEY

UNITED STATES PATENT OFFICE 2,583,719

GROMMET

Harold A. White, St. Thomas, Ontario, Canada, assignor to The Weatherhead Company, Cleveland, Ohio, a corporation of Ohio Application May 10, 1946, Serial No. 668,883

1 Claim. (Cl. 24—141)

This invention relates to grommets or bushings, more particularly to a grommet adapted to be mounted in glass or other easily broken material such as porcelain, hard rubber and other plastics, painted or enameled sheets or the like.

As an example of one use to which my improved grommet may be put and how it is superior to grommets of the prior art, assume that it is desired to place a grommet in apertures of a glass mirror in order that the mirror may be hung. Grommets of the prior art, when deformed about the glass, would tend to crack the glass under tool pressure. Of course, the tendency to crack the glass might be reduced by placing resilient washers between the ends of the grommet and the glass. But this does not solve the problem because even with the resilient washers present, if enough force is applied to deform the blank end of the grommet in order to retain it, it is likely that this force is great enough to deform or shorten that part of the grommet which passes through the glass. Thus, even though the washers are present, breaking of the glass or sheet material can easily occur if a slight miscalculation is made as to the amount of force applied to the grommet.

It is an object of this invention to insure that no appreciable shortening or distortion of that portion of the grommet passing through the glass occurs when the grommet is deformed in place and to permit a certain range of deforming forces so that even if more force is applied than is necessary to deform the grommet this force will not be transmitted to the glass.

It is another object of this invention to provide a grommet which is compact and yet which will hold firmly and which can be readily manufactured in quantity at reduced cost.

These and other objects will be apparent to those skilled in this art as the following description proceeds.

Figure 2:
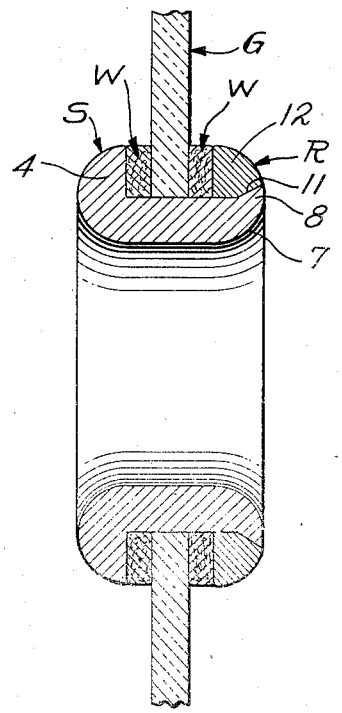

In the drawings:

Fig. 1 shows the two parts of my grommet and a pair of washers which may be associated therewith; and Fig. 2 shows my grommet assembled with the body or sheet of glass or other breakable material.

As seen in Fig. 1, the grommet member S has a sleeve body portion 1 internally apertured as at 2 with a substantially cylindrical periphery 3. I prefer that the sleeve or body portion 1 be integral with a radial abutment portion 4 which may have a curved end 5 and which is preferably formed with a radial wall 6. The other end of the sleeve body has a fillet 7 and integral with this end of the body is a tapered lip 8 of reduced section. It is desirable to design the grommet so that the sleeve S is of the right length to permit the assembly of one or more washers W preferably there being one washer on each side of the sheet material. The washers may be made of any relatively flexible material such as cork, fibre, rubber, etc. The other part or member of the grommet is the retaining ring R which is apertured as at 10 to fit over the surface 3 of the sleeve S. Radial wall 9 is complementary to the wall 6 on the sleeve and the tapered outwardly flaring surface 11 is formed on the ring for purposes to be hereinafter described. I prefer that the other surface of the ring be given a convex curvature as at 12.

As seen in Fig. 2, when the grommet is assembled the ring R is slipped over the body or member S which has been inserted through the sheet material G with the washers W on each side of the material. After the parts are slipped together the lip 8 is pressed, spun or peened from the configuration shown in Fig. 1 to that shown in Fig. 2 wherein the lip 8 engages the tapered wall 11 of the ring, the parts being designed so that curve 7 on the body or sleeve 1 of member S merges smoothly with curve 12 on the ring. This retains the ring and grommet assembly in place. The tapered surface of the ring in its undeformed condition shown in Fig. 1 facilitates closing the lip about the ring and insures that the lip will deform in the proper direction.

It can be seen that by properly proportioning the body or sleeve 1 and the ring, if more force is applied to deform the lip than is required to accomplish that deformation, since the body portion 1 of the member S is somewhat thicker than the lip, the extra force will not materially shorten the sleeve or body 1 and will not tend to crack the glass. This is desirable because it gives some tolerance in assembly and makes mass production or assembly operations possible. Although the proportions are not critical, as a general guide it might be stated that for a given size grommet the lip portion is made thick enough to produce the desired holding action and the body portion 1 of member S is made enough thicker than the lip portion to give the desired tolerance in pressure applied during the assembly.

Various modifications may be made without departing from the spirit of my invention, the curvatures at 5 and 7 and 12 may be varied without affecting the operation of the device. Considerations with respect to the relative thickness of the lip and body portions of the sleeve have been mentioned. I have found that an angle of about 30° for the tapered lip portion 8 works very well but this angle may be varied without modifying the basic operation of my device. Although I disclose the use of a pair of washers largely to withstand shock during subsequent use of the article, my device could be assembled by only using one washer on many frangible articles and on others its would be possible to assemble my grommet and omit the washers without cracking the article so long as a slight play in the mounting is permissible, due to the novel protective feature afforded by the cooperation of the body and lip portions.

These and other modifications may be made without departing from the spirit of my invention as defined in the appended claim.

Having thus described a preferred embodiment of the present invention so that others skilled in the art may be able to understand and practice the same, I state that what I desire to secure by Letters Patent is defined in what is claimed.

I claim:

A grommet assembly comprising a grommet body member having a sleeve portion with a cylindrical periphery and a radial flange at one end thereof, an apertured sheet of material at least a portion of which is frangible, a compressible washer, and a grommet ring member; said sleeve portion fitting within the aperture in said sheet of material, washer, and ring member; a lip extending integrally from the other end of said sleeve portion, said lip being radially thinner in section than said sleeve portion with its outer surface intersecting the cylindrical periphery of said sleeve portion, said lip being deformed against said ring member to compress said washer and clamp said sheet and washer against said radial flange, the radial thickness of said sleeve portion being sufficiently greater than that of said lip that the resistance of said lip to axial deformation against said ring is considerably less than the resistance of said sleeve portion to axial shortening.

HAROLD A. WHITE.

REFERENCES CITED

The following references are of record in the file of this patent:

UNITED STATES PATENTS

| Number | Name | Date |
|---|---|---|
| 624,150 | Andrus | May 2, 1899 |
| 1,415,542 | Fuegel et al. | May 9, 1922 |
| 1,651,252 | Chesler | Nov. 29, 1927 |
| 1,816,803 | Flagler | July 28, 1931 |
| 1,896,028 | Burvenick | Jan. 31, 1933 |
| 2,157,366 | Vigroux | May 9, 1939 |

FOREIGN PATENTS

| Number | Country | Date |
|---|---|---|
| 303,529 | Italy | Dec. 6, 1932 |
| 842,808 | France | Mar. 13, 1938 |